(12) United States Patent
Kaplan et al.

(10) Patent No.: US 10,899,286 B2
(45) Date of Patent: Jan. 26, 2021

(54) WINDSCREEN FOR DRIVING ASSISTANCE

(71) Applicant: SAINT-GOBAIN GLASS FRANCE, Courbevoie (FR)

(72) Inventors: Benjamin Kaplan, Aachen (DE); Klaus Schmalbuch, Aachen (DE); Stefan Droste, Herzogenrath (DE); Christian Effertz, Aachen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 16/342,678

(22) PCT Filed: Oct. 17, 2017

(86) PCT No.: PCT/FR2017/052847
§ 371 (c)(1),
(2) Date: Apr. 17, 2019

(87) PCT Pub. No.: WO2018/073528
PCT Pub. Date: Apr. 26, 2018

(65) Prior Publication Data
US 2020/0047689 A1  Feb. 13, 2020

(30) Foreign Application Priority Data
Oct. 17, 2016  (FR) ..................... 16 60036

(51) Int. Cl.
*B60R 11/04* (2006.01)
*B32B 17/10* (2006.01)
(Continued)

(52) U.S. Cl.
CPC ........ *B60R 11/04* (2013.01); *B32B 17/10036* (2013.01); *B32B 17/1044* (2013.01);
(Continued)

(58) Field of Classification Search
CPC .......... B60R 11/04; B60R 1/001; B60R 1/02; B60R 2011/0026; B32B 17/10036;
(Continued)

(56) References Cited

U.S. PATENT DOCUMENTS

| 6,132,882 A | 10/2000 | Landin et al. | |
| 2017/0064175 A1* | 3/2017 | Furutake | ............ G06K 9/00798 |
| 2019/0061482 A1* | 2/2019 | Kikuchi | ..................... B60J 1/00 |

FOREIGN PATENT DOCUMENTS

DE  103 33 978 A1  2/2005
DE  10 2008 014089 A1  9/2009
(Continued)

OTHER PUBLICATIONS

Machine translation of DE102008014089 (Year: 2008).*
International Search Report as issued in International Patent Application No. PCT/FR2017/052847, dated Dec. 19, 2017.

*Primary Examiner* — John R Schnurr
(74) *Attorney, Agent, or Firm* — Pillsbury Winthrop Shaw Pittman LLP

(57) ABSTRACT

A laminated motor-vehicle windshield includes exterior glass sheet and an interior glass sheet, which sheets are joined together by an interlayer made of a thermoplastic of refractive index $n_1$. The windshield is equipped with a through-hole that passes through at least one of the glass sheets and may pass through the interlayer and wherein the hole is filled with an optical device that is suitable for deviating a light beam incident substantially horizontally on that face of the windshield which is exposed to the exterior of the vehicle and for making it converge, substantially without deformation, on an image-capturing device of a camera, such as a CCD or CMOS detector, placed facing that face of the windshield which is turned toward the passenger compartment of the vehicle. The detector is arranged substantially parallelly to the surface of the windshield.

18 Claims, 3 Drawing Sheets

Figure 1:
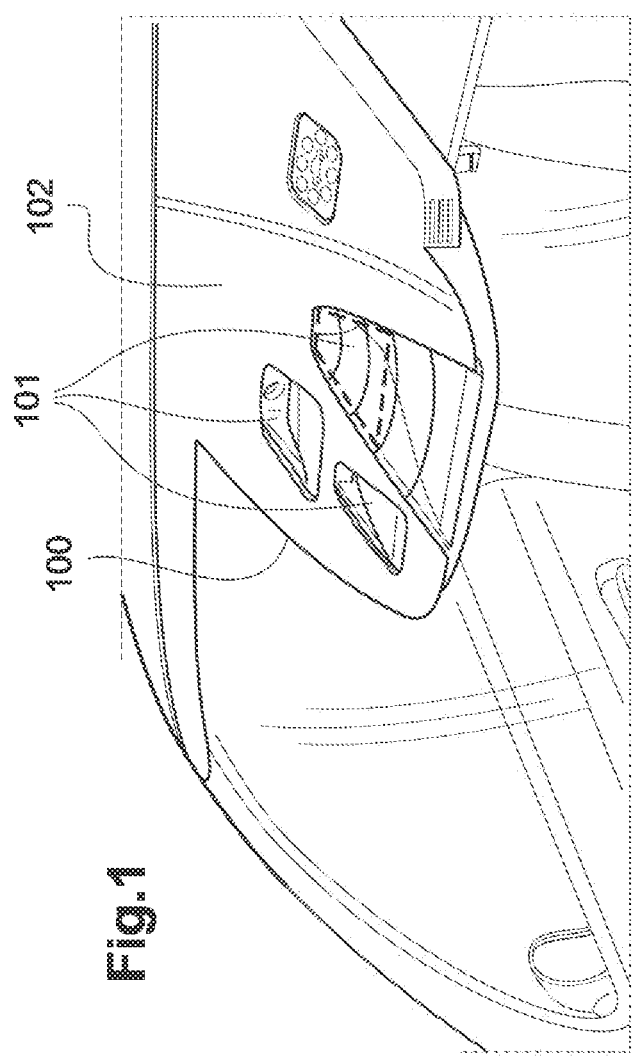

(51) Int. Cl.
*B32B 27/30* (2006.01)
*B32B 27/40* (2006.01)
*B60J 1/00* (2006.01)
*B60J 1/02* (2006.01)
*H04N 5/225* (2006.01)
*H04N 7/18* (2006.01)
*H04N 5/232* (2006.01)
*B60R 11/00* (2006.01)

(52) U.S. Cl.
CPC .... *B32B 17/1077* (2013.01); *B32B 17/10743* (2013.01); *B32B 17/10761* (2013.01); *B32B 27/308* (2013.01); *B32B 27/40* (2013.01); *B60J 1/001* (2013.01); *B60J 1/02* (2013.01); *H04N 5/2253* (2013.01); *H04N 5/2254* (2013.01); *H04N 5/232* (2013.01); *H04N 7/18* (2013.01); *B32B 2305/34* (2013.01); *B32B 2307/418* (2013.01); *B32B 2329/06* (2013.01); *B32B 2333/04* (2013.01); *B32B 2375/00* (2013.01); *B32B 2551/00* (2013.01); *B32B 2605/006* (2013.01); *B32B 2605/08* (2013.01); *B60R 2011/0026* (2013.01)

(58) Field of Classification Search
CPC .......... B32B 17/1044; B32B 17/10743; B32B 17/10761; B32B 17/1077; B32B 27/308; B32B 27/40; B32B 2305/34; B32B 2307/418; B32B 2329/06; B32B 2333/04; B32B 2375/00; B32B 2551/00; B32B 2605/006; B32B 2605/08; H04N 5/2253; H04N 5/2254; H04N 7/18
See application file for complete search history.

(56) References Cited

FOREIGN PATENT DOCUMENTS

| DE | 102008014089 A1 | * | 9/2009 | ............. B60R 11/04 |
|----|-----------------|---|--------|--------------------------|
| EP | 0 934 851 A2 | | 8/1999 | |
| EP | 2 120 025 A1 | | 11/2009 | |
| EP | 2 390 141 A1 | | 11/2011 | |
| WO | WO 2016/143582 A1 | | 9/2016 | |

* cited by examiner

WINDSCREEN FOR DRIVING ASSISTANCE

CROSS REFERENCE TO RELATED APPLICATIONS

This application is the U.S. National Stage of PCT/FR2017/052847, filed Oct. 17, 2017, which in turn claims priority to French Patent Application No. 1660036 filed Oct. 17, 2016, the entire contents of all applications are incorporated herein by reference in their entireties.

The invention relates to a glazing, in particular a windshield, allowing image-data to be captured in a motor vehicle in association with a camera system of the ADAS (Advanced Driver Assistance System) type. The invention also describes a device combining said glazing (said windshield) and said camera for such a capture of information.

Automotive glazings and the associated technology are constantly evolving, in particular in order to improve safety. Advanced driver assistance systems (or ADAS) are an important innovation. According to the general principle, cameras placed behind the windshield allow these ADAS to assist the driver while he is driving. Such an ADAS device may in particular have the following functions, the list below not being exhaustive:
  to warn the driver when the vehicle unintentionally departs from its lane;
  to signal an emergency stop;
  to improve nightvision;
  to allow a 360 degree view via control screens visible to the driver;
  to recognize road signs installed at the edge of the road;
  to guarantee a precise detection of distance and of objects, in a two- or even three-dimensional mode (in particular via a stereoscopic effect, for example using a plurality of cameras).

Most conventionally, the device comprises at least one camera placed behind the windshield of the vehicle. In present-day versions of such devices, there is a problem with bulk. Specifically, the space available on the front glazing of a vehicle for such devices is very limited because they must not obstruct the view of the driver, for obvious safety reasons. Such a zone 100, sometimes called Y0 in the field, is conventionally located in the upper central portion of the windshield as indicated in the appended FIG. 1. In this zone 100, the one or more cameras are oriented with a certain angle with respect to the surface of the windshield. In particular, the objective and the (CCD or CMOS) image sensor that is coupled thereto, are oriented directly toward the image-capture zone, in a direction almost parallel to the ground, i.e. only slightly inclined toward the road, as illustrated in the appended figures. In other words, the camera is oriented toward the road with an angle that is small, and suitable for providing the aforementioned functions.

Practically, regarding the windshield, on account of the size of the objective, of the sensor of the camera and of its housing, for each camera to be able to see a suitable field of view it is therefore necessary, for each of said cameras, for the collected exterior beam (or rather all of the beams collected in a pre-set solid angle) to pass through a specific window 101 of trapezoidal shape on the windshield, such as illustrated by the appended FIG. 1. Given that the windshield itself, in the image-capture zone, makes a relatively small angle to the road, the implementation of a camera of small size therefore requires there to be available, on the windshield, a trapezoidal window 101 of relatively large size, and the extent of which increases with the size of the solid angle to be observed, as illustrated in the appended FIG. 1.

Such a configuration furthermore implies the use of a black coating 102, such as a layer of black lacquer or enamel, on all the area of the glazing placed facing the device incorporating the ADAS camera, including its housing, so as to hide the latter.

Furthermore, if a plurality of cameras are associated, for example in order to provide a plurality of functions such as described above, or even for a reconstruction and/or an analysis in a (stereoscopic) three-dimensional mode, it in addition proves to be necessary to separate the various trapezoidal zones corresponding to each camera from one another, as illustrated in FIG. 1. In such a case in particular, the black area 102 printed on the glazing may be of very large dimensions, in proportions liable to in particular decrease the overall field of view of the driver through the windshield. In most present-day embodiments incorporating a plurality of ADAS cameras, it is substantially all the area of the upper central portion of the windshield that must be covered with a black printed layer, as illustrated in the appended FIG. 1.

The aim of the present invention is to provide a solution allowing the problems described above to be solved and in particular allowing the problems of bulk described above to be avoided, in particular by decreasing the black area that is present on the windshield to isolate or mask the ADAS cameras present behind the glazing.

In particular, the preceding problem has been able to be solved by modifying the orientation of the optics of the camera so as to tilt the latter by an angle $\beta$ toward the vertical.

More precisely, the present invention relates to a laminated motor-vehicle windshield comprising two glass sheets, an exterior glass sheet and an interior glass sheet, which sheets are joined together by an interlayer made of a thermoplastic of refractive index $n_1$, wherein said windshield is equipped with a through-hole that passes through at least one of said glass sheets and preferably through said interlayer and wherein said hole is filled with an optical device that is suitable for deviating a light beam incident substantially horizontally on the face of the windshield which is exposed to the exterior of the vehicle and for making it converge, substantially without deformation, on an image-capturing device of a camera, such as a CCD or CMOS detector, placed facing that face of the windshield which is turned toward the passenger compartment of the vehicle, the surface of said detector being arranged substantially parallelly to the surface of said windshield.

The expression "substantially horizontally" is understood, by way of example, to mean that the angle made between the ground and the rays of the light beam is smaller than 30° and in particular is smaller than 20°, or even indeed smaller than 10°.

The expression "substantially parallelly" is understood, by way of example, to mean that the angle made between the internal surface of the windshield and the detecting area of the surface of the CCD detector is smaller than 30°, and in particular is smaller than 20° or indeed is smaller than 10°.

Certain advantageous but nonlimiting embodiments of the present invention are described below, which may of course be combined with one another where needs be:
  Said windshield is equipped with a through-hole that passes through said glass sheets and said interlayer.

The optical device comprises a combination of one or more convergent lenses and one or more divergent lenses.

The optical device comprises, from the exterior to the interior of the glazing, a first convergent lens, a divergent lens and a convergent lens.

Alternatively, said windshield may be equipped with a through-hole that passes only through the exterior glass sheet, into which whole said optical device is inserted. In such an embodiment, for example, the optical device comprises, from the exterior to the interior of the glazing, a convergent lens and a divergent lens. Advantageously, a convergent lens is adhesively bonded to the back face of the interior glass sheet.

The optical device furthermore comprises a plastic of refractive index $n_2$ lower than or equal to $n_1$.

The optical device furthermore comprises a plastic of refractive index $n_2$ lower than $n_1$.

The optical device comprises, from the exterior to the interior of the glazing, a first convergent lens, a divergent lens, a convergent lens and optionally a plastic of refractive index $n_2$ lower than $n_1$ placed between said lenses.

Said refractive index $n_2$ is lower than the refractive index $n_1$ by at least 0.05 and preferably at least 0.1.

The interlayer is made of PVB.

The interlayer is made of PVB, and the plastic comprised in the optical device has a refractive index $n_2$ comprised between 1.31 and 1.43.

The plastic of the layer of index $n_2$ is chosen from optionally fluorinated, aliphatic urethane acrylate polymers.

Said optical device is located in a central upper zone of the glazing.

The invention also relates to a device for capturing, through a windshield, images issued from a zone of capture of light radiation incident substantially horizontally on that face of a windshield which is exposed to the exterior of the vehicle, said device being characterized in that it comprises a camera, in particular an ADAS camera, comprising an image sensor and a windshield such as described above, and wherein the surface of the image sensor of the camera is arranged substantially parallelly to the surface of said windshield.

FIG. 1 illustrates a perspective view of an image-capturing device that is currently commercially available and as described above.

Figure 2:
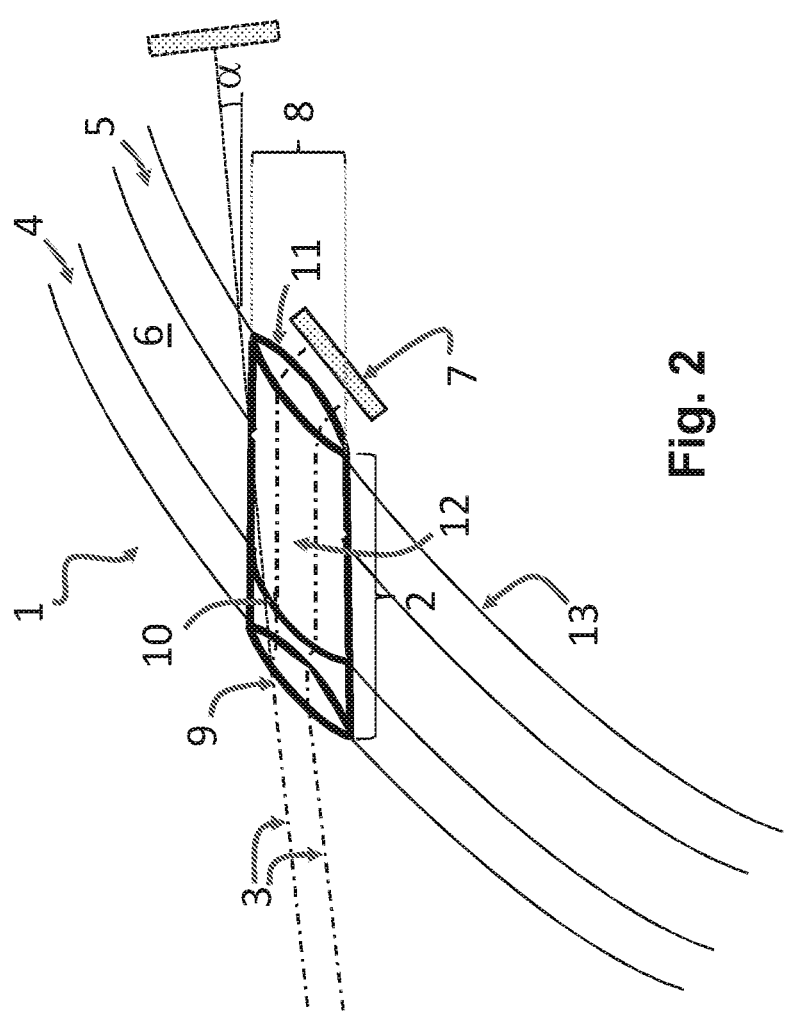

FIG. 2 schematically shows a sagittal cross section of a windshield according to a first configuration according to the invention, and the path of a light ray from the exterior of the vehicle to the objective of an ADAS camera placed behind the windshield.

Figure 3:
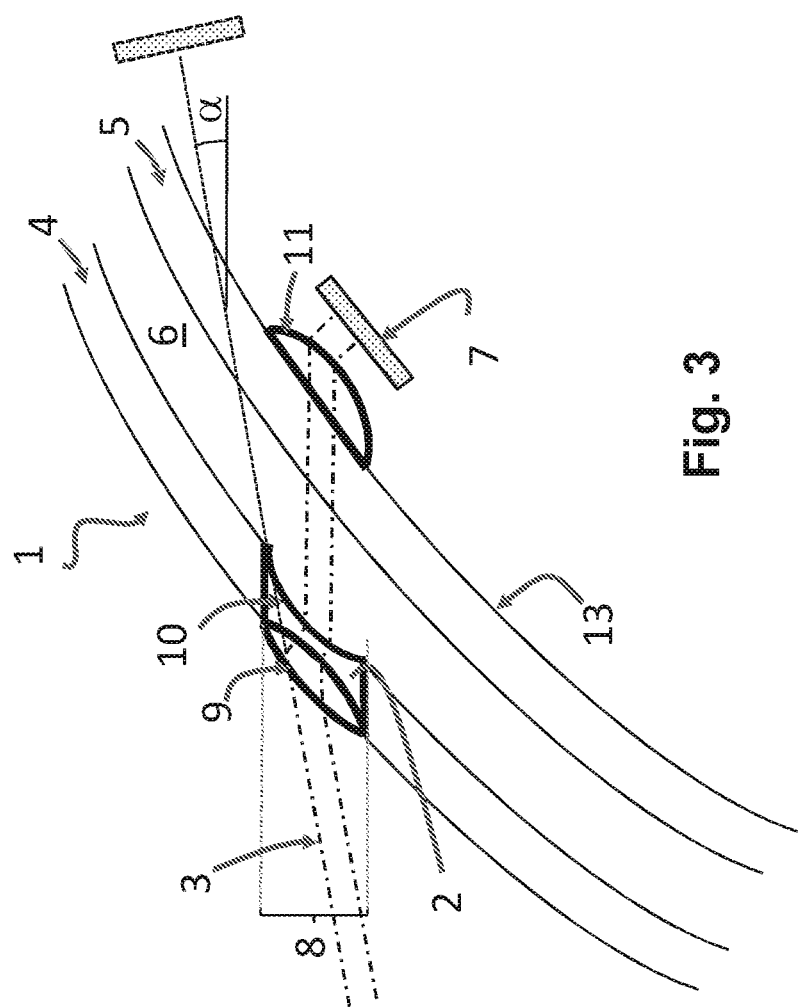

FIG. 3 schematically shows a sagittal cross section of a windshield according to a second configuration according to the invention, and the path of a light ray from the exterior of the vehicle to the objective of an ADAS camera placed behind the windshield.

More particularly, FIG. 2 illustrates one embodiment of the present invention, in more detail but nonlimitingly.

In this figure, a sagittal cross-sectional plane of a laminated glazing has been shown. An initial light beam 3 is incident from the exterior environment of the vehicle, on the face of the glass sheet 4 that is the most external of the windshield, and in particular from the zone of the road that it is desired to observe with a camera, which has been schematically shown only by its sensor 7 in FIG. 2, and which is located in an upper portion of the windshield 1. The sensor 7 preferably comprises a CCD (charge-coupled device) or CMOS (complementary metal oxide semiconductor) matrix-array area.

By light beam, what is meant in the context of the present invention is all the light rays arriving in a certain solid angle and that it is sought to capture via the camera 7. In FIG. 2, this radiation has been represented, for the sake of clarity, by only two light rays.

As illustrated in FIG. 2, the exterior (to the vehicle) light beam 3 is incident, on the windshield, with an angle of incidence α that is small with respect to the horizontal, in principle smaller than 30°, or even smaller than 20°, or indeed smaller than 10°. The installation of a camera directly behind the windshield 1 conventionally requires, if said beam is to be captured, the axis of orientation of the camera to therefore itself make a small angle α with respect to the road and a large angle with respect to the perpendicular to the interior surface 13 of the windshield, in the zone of installation of said camera, as represented by the dashed lines in FIG. 2.

As indicated above with reference to FIG. 1, in such a configuration, the black enameled or lacquered area 102 formed on the glazing to hide the installation in its entirety may be of very large size, to the point of possibly notably decreasing the overall field of view of the driver through the windshield itself.

The glazing 1 shown in FIG. 2 is a conventional laminated windshield comprising a first glass sheet 4 and a second glass sheet 5, the two glass sheets being joined to each other by an interlayer 6 made of a thermoplastic, and most often made of polyvinyl butyral (PVB). The windshield is obtained by hot lamination of the elements 4, 5 and 6 in a way that is well-known and conventional. Without departing from the scope of the invention, the interlayer may of course comprise a plurality of sheets made of thermoplastics of different natures, for example of different hardnesses in order to provide an acoustic function, such as for example described in the publication U.S. Pat. No. 6,132,882, in particular a set of PVB sheets of different hardnesses. Likewise, one of the glass sheets may be thin with respect to the thicknesses conventionally used. The interlayer may also according to the invention have a wedge shape, in particular with a view to a head-up display (HUD) application. Furthermore, one of the sheets of the interlayer may be bulk tinted.

In the interlayer 6, in that zone of the glazing which is located in the final positional region desired for the camera, a cut-out is formed in the windshield, so as to produce a hole 8 of sufficient and necessary size to make it possible to insert therein an optical device 2 according to the invention, the thickness of which is substantially identical to that of the windshield.

The device 2 described in FIG. 2 comprises a set of convergent and divergent lenses, though such an embodiment is not to be considered as limiting the scope of the present invention. The lenses are dimensioned and spaced using prior-art techniques in such a way that the radiation 3, which is initially substantially horizontal as described above, is deviated and made to converge, via said optical device, on the sensing portion of the sensor 7, the latter thus being able to be repositioned such that its active area is now arranged substantially parallelly to the internal surface of the second glass sheet 5, in the image-capture zone. In this way, it becomes possible to tilt the camera assembly and thus minimize, behind the glazing, the space occupied by all the elements serving for image processing and their housings. Furthermore, it is possible to bring the sensor 7 of the camera right up to the glazing, this also resulting in a substantial decrease in the bulk associated with its implementation.

As also explained above, such a configuration allows, in this way, the dimensions of the trapezoidal zone passed through by the beam on the windshield and therefore, in the end, the total area of the black zone 102 printed on the glazing, to be very greatly limited. By way of example, it is possible to calculate that a tilt β of only 5° of the camera allows the area of said trapezoidal zone to be decreased by more than 50%. Thus, in FIG. 1, the trapezoidal zone according to the current configuration has been shown with solid lines and the trapezoidal zone in a configuration according to the present invention has been shown with dashed lines.

According to the invention, it therefore becomes possible to greatly limit the area of the black zone printed on the windshield or alternatively to place a higher number of cameras in the accessible zone of the windshield, in particular with a view to achieving stereoscopy or even in order to increase the number of points of the road monitored and/or the number of functions such as described above.

More precisely, as illustrated in FIG. 2 by the dot-dashed lines that represent the path of the light rays 3 in the optical device, the incident radiation is deviated by a convergent first lens 9. The beam thus deviated is then rectified by a divergent second lens 10 and advantageously confined in the optical device by a thermoplastic 12 the refractive index $n_2$ of which is lower than that of the thermoplastic sheet 6.

This thermoplastic of index $n_2$ is more particularly chosen from plastics that have properties allowing adhesion to plastic or glass surfaces.

In particular, the material 12 is advantageously and preferably chosen in such a way that its refractive index $n_2$ is significantly lower than that of the material from which the interlayer sheet 6 is made. By significantly lower, what is meant is an index difference of at least 0.05 and preferably of at least 0.1.

In particular and for example, if the material 6 is a thermoplastic of the PVB type, the refractive index of which is about 1.48, the material chosen for the material of index $n_2$ may advantageously be chosen from acrylate polymers, in particular optionally fluorinated, aliphatic urethane acrylate polymers, the refractive index of which may vary between 1.31 and 1.42 depending on the formulation. Such adhesives polymers are for example sold by Nordland under the references NOA 1315, NOA 132, NOA 1327, NOA 1328, NOA 133, NOA 13685, NOA 1375, NOA 138, NOA 142.

The dimensions of the cut-out section 8 are normally small, considered with respect to the area of the windshield or of the glazing.

The shape and the dimensions of the cut-out section 8 are also configured, according to prior-art techniques, to effectively and selectively collect all of the incident light radiation that a) passes through the windshield, b) is contained in an exterior (to the vehicle) solid-angle range, and c) originates from the zone, in front of the vehicle, that it is sought to capture via the camera.

FIG. 3 illustrates another embodiment of the present invention, in which the windshield is equipped with a through-hole 8 that this time passes only through the exterior glass sheet 4, into which hole said optical device 2 that comprises the combination of a convergent lens and a divergent lens is inserted. According to this embodiment, the interior glass sheet 5 contains no cut-out and is passed through by the light radiation deviated by the optical device 2. According to this embodiment, a convergent lens 11 is this time placed (adhesively bonded) on the back face 13 of the interior glass sheet 5, in order to deviate the beam, substantially without deformation, towards the sensor 7 of the camera.

The invention claimed is:

1. A laminated motor-vehicle windshield comprising an exterior glass sheet and an interior glass sheet, which exterior and interior glass sheets are joined together by an interlayer made of a thermoplastic of refractive index $n_1$, wherein said windshield is equipped with a through-hole that passes through at least one of said exterior and interior glass sheets and wherein said through-hole is filled with an optical device that is suitable for deviating a light beam incident substantially horizontally on a face of the windshield which is exposed to the exterior of the vehicle and for making the light beam converge, substantially without deformation, on an image-capturing device of a camera placed facing a face of the windshield which is turned toward the passenger compartment of the vehicle, said image-capturing device being arranged substantially parallelly to a surface of said windshield, wherein the through-hole extends in the exterior glass sheet so that at least part of a first convergent lens of the optical device is positioned in the exterior glass sheet.

2. The laminated windshield as claimed in claim 1, wherein the optical device comprises a combination of one or more convergent lenses and one or more divergent lenses.

3. The laminated windshield as claimed in claim 1, wherein said through-hole passes through said exterior and interior glass sheets and said interlayer.

4. The laminated windshield as claimed in claim 1, wherein the optical device comprises, from the exterior to the interior of the glazing, said first convergent lens a divergent lens and a second convergent lens.

5. The laminated windshield as claimed in claim 1, wherein the optical device further comprises a plastic of refractive index $n_2$ lower than or equal to $n_1$.

6. The laminated windshield as claimed in claim 1, wherein the optical device further comprises a plastic of refractive index $n_2$ lower than $n_1$.

7. The laminated windshield as claimed in claim 1, wherein said optical device is located in a central upper zone of the glazing.

8. The laminated windshield as claimed in claim 1, wherein the image-capturing device is a CCD or CMOS detector.

9. A laminated motor-vehicle windshield comprising an exterior glass sheet and an interior glass sheet, which exterior and interior glass sheets are joined together by an interlayer made of a thermoplastic of refractive index $n_1$, wherein said windshield is equipped with a through-hole that passes through at least one of said exterior and interior glass sheets and wherein said through-hole is filled with an optical device that is suitable for deviating a light beam incident substantially horizontally on a face of the windshield which is exposed to the exterior of the vehicle and for making the light beam converge, substantially without deformation, on an image-capturing device of a camera placed facing a face of the windshield which is turned toward the passenger compartment of the vehicle, said image-capturing device being arranged substantially parallelly to a surface of said windshield, wherein the optical device comprises, from the exterior to the interior of the glazing, a first convergent lens, a divergent lens a convergent lens and a plastic of refractive index $n_2$ lower than $n_1$ placed between said lenses.

10. The laminated windshield as claimed in claim 9, wherein the refractive index n2 is lower than the refractive index n1 by at least 0.05.

11. The laminated windshield as claimed in claim 10, wherein the refractive index n2 is lower than the refractive index n1 by at least 0.1.

12. A laminated motor-vehicle windshield comprising an exterior glass sheet and an interior glass sheet, which exterior and interior glass sheets are joined together by an interlayer made of a thermoplastic of refractive index $n_1$, wherein said windshield is equipped with a through-hole that passes through at least one of said exterior and interior glass sheets and wherein said through-hole is filled with an optical device that is suitable for deviating a light beam incident substantially horizontally on a face of the windshield which is exposed to the exterior of the vehicle and for making the light beam converge, substantially without deformation, on an image-capturing device of a camera placed facing a face of the windshield which is turned toward the passenger compartment of the vehicle, said image-capturing device being arranged substantially parallelly to a surface of said windshield, wherein the interlayer is made of PVB, and wherein the plastic comprised in the optical device has a refractive index $n_2$ comprised between 1.31 and 1.43.

13. A laminated motor-vehicle windshield comprising an exterior glass sheet and an interior glass sheet, which exterior and interior glass sheets are joined together by an interlayer made of a thermoplastic of refractive index $n_1$, wherein said windshield is equipped with a through-hole that passes through at least one of said exterior and interior glass sheets and wherein said through-hole is filled with an optical device that is suitable for deviating a light beam incident substantially horizontally on a face of the windshield which is exposed to the exterior of the vehicle and for making the light beam converge, substantially without deformation, on an image-capturing device of a camera placed facing a face of the windshield which is turned toward the passenger compartment of the vehicle, said image-capturing device being arranged substantially parallelly to a surface of said windshield, wherein the plastic of the layer of index $n_2$ is chosen from optionally fluorinated, aliphatic urethane acrylate polymers.

14. A laminated motor-vehicle windshield comprising an exterior glass sheet and an interior glass sheet, which exterior and interior glass sheets are joined together by an interlayer made of a thermoplastic of refractive index $n_1$, wherein said windshield is equipped with a through-hole that passes through at least one of said exterior and interior glass sheets and wherein said through-hole is filled with an optical device that is suitable for deviating a light beam incident substantially horizontally on a face of the windshield which is exposed to the exterior of the vehicle and for making the light beam converge, substantially without deformation, on an image-capturing device of a camera placed facing a face of the windshield which is turned toward the passenger compartment of the vehicle, said image-capturing device being arranged substantially parallelly to a surface of said windshield, wherein said through-hole passes only through the exterior glass sheet, into which hole said optical device is inserted.

15. The laminated windshield as claimed in claim 14, wherein the optical device comprises, from the exterior to the interior of the glazing, a convergent lens and a divergent lens.

16. The laminated windshield as claimed in claim 14, wherein a convergent lens is placed on the back face of the interior glass sheet.

17. A device for capturing, through a windshield, images issued from a zone of capture of light radiation incident substantially horizontally on a face of a windshield which is exposed to the exterior of the vehicle, said device comprising:
a camera comprising an image sensor; and
a windshield according to claim 1,
wherein a surface of the image sensor of the camera is arranged substantially parallelly to a surface of said windshield.

18. The device as claimed in claim 17, wherein the camera is an ADAS camera.

* * * * *